(12) United States Patent
Vanderaar et al.

(10) Patent No.: US 7,961,666 B2
(45) Date of Patent: *Jun. 14, 2011

(54) DYNAMIC LINK ASSIGNMENT IN A COMMUNICATION SYSTEM

(75) Inventors: Mark J. Vanderaar, Medina, OH (US); Matthew D. Nimon, Hinckley, OH (US); William H. Thesling, Hudson, OH (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/719,643

(22) Filed: Mar. 8, 2010

(65) Prior Publication Data

US 2010/0157931 A1 Jun. 24, 2010

Related U.S. Application Data

(63) Continuation of application No. 12/505,289, filed on Jul. 17, 2009, now Pat. No. 7,706,315, which is a continuation of application No. 11/744,450, filed on May 4, 2007, now Pat. No. 7,684,368, which is a continuation of application No. 09/906,171, filed on Jul. 16, 2001, now Pat. No. 7,230,908.

(60) Provisional application No. 60/220,261, filed on Jul. 24, 2000.

(51) Int. Cl.
*H04B 7/185* (2006.01)

(52) U.S. Cl. ........ 370/317; 370/350; 370/392; 370/401; 455/205

(58) Field of Classification Search .......... 370/315–316, 370/352, 401, 466, 469, 317, 350, 392; 455/12.1, 455/69, 427, 205
See application file for complete search history.

(56) References Cited

U.S. PATENT DOCUMENTS

| 4,494,238 A | 1/1985 | Groth, Jr. |
| 4,888,769 A | 12/1989 | Deal |
| 5,007,045 A | 4/1991 | Tsuzuki |
| 5,020,056 A | 5/1991 | Chennakeshu |
| 5,038,398 A | 8/1991 | Wills |
| 5,050,166 A | 9/1991 | Cantoni et al. |
| 5,214,642 A | 5/1993 | Kunimoto et al. |
| 5,229,992 A | 7/1993 | Jurkevich et al. |
| 5,247,516 A | 9/1993 | Bernstein et al. |
| 5,282,202 A | 1/1994 | Bernstein et al. |
| 5,282,207 A | 1/1994 | Jurkevich et al. |
| 5,425,029 A | 6/1995 | Hluchyj et al. |
| 5,461,618 A | 10/1995 | Chen et al. |
| 5,535,221 A | 7/1996 | Hijikata et al. |
| 5,592,468 A | 1/1997 | Sato |

(Continued)

FOREIGN PATENT DOCUMENTS

WO WO 97/16046 A1 5/1997

*Primary Examiner* — Dwayne D Bost
*Assistant Examiner* — Inder P Mehra
(74) *Attorney, Agent, or Firm* — Kilpatrick Townsend & Stockton LLP (57) ABSTRACT

An architecture for the dynamic assignment of links in a multi-user communication system. A plurality of information channels are provided in a forward communication link of the communication system for carrying channel information of the plurality of information channels from a transmitter to a plurality of corresponding receiving devices. The channel information in corresponding select ones of the plurality of information channels is varied dynamically in response to link conditions of the associated receiving devices to more efficiently utilize the channel bandwidth.

29 Claims, 7 Drawing Sheets

U.S. PATENT DOCUMENTS

| | | |
|---|---|---|
| 5,592,469 A | 1/1997 | Szabo |
| 5,600,653 A | 2/1997 | Chitre et al. |
| 5,602,836 A | 2/1997 | Papadopoulos et al. |
| 5,642,421 A | 6/1997 | Gray et al. |
| 6,172,972 B1 | 1/2001 | Birdwell et al. |
| 6,188,684 B1 | 2/2001 | Setoyama et al. |
| 6,236,656 B1 | 5/2001 | Westerberg et al. |
| 6,240,094 B1 | 5/2001 | Schneider |
| 6,240,274 B1 | 5/2001 | Izadpanah |
| 6,246,713 B1 | 6/2001 | Mattisson |
| 6,317,409 B1 | 11/2001 | Murakami |
| 6,331,978 B1 | 12/2001 | Ravikanth et al. |
| 6,366,776 B1 | 4/2002 | Wright et al. |
| 6,366,780 B1 | 4/2002 | Obhan |
| 6,381,461 B1 | 4/2002 | Besson et al. |
| 6,400,750 B1 | 6/2002 | Lee et al. |
| 6,404,755 B1 | 6/2002 | Schafer |
| 6,407,993 B1 * | 6/2002 | Moulsley ............... 370/347 |
| 6,442,149 B1 | 8/2002 | Nakano et al. |
| 6,477,069 B1 | 11/2002 | Kern |
| 6,532,227 B1 | 3/2003 | Leppisaari et al. |
| 6,618,367 B1 | 9/2003 | Riazi et al. |
| 6,625,776 B1 | 9/2003 | Wright et al. |
| 6,661,781 B1 | 12/2003 | Chitre et al. |
| 6,700,881 B1 | 3/2004 | Kong et al. |
| 6,724,721 B1 | 4/2004 | Cheriton |
| 6,728,233 B1 | 4/2004 | Park et al. |
| 6,741,837 B1 | 5/2004 | Nakano et al. |
| 6,865,393 B1 | 3/2005 | Baum et al. |
| 6,931,009 B1 | 8/2005 | Agarwal |
| 6,975,611 B1 | 12/2005 | Balachandran et al. |
| 7,133,352 B1 | 11/2006 | Hadad |
| 7,133,380 B1 | 11/2006 | Winters et al. |
| 7,177,298 B2 | 2/2007 | Chillariga et al. |
| 2002/0006167 A1 | 1/2002 | McFarland |
| 2005/0100016 A1 | 5/2005 | Miller et al. |
| 2005/0286467 A1 | 12/2005 | Chang et al. |

* cited by examiner

Fig. 10

DYNAMIC LINK ASSIGNMENT IN A COMMUNICATION SYSTEM

This application is a Continuation of U.S. patent application Ser. No. 12/505,289, filed Jul. 17, 2009 now U.S. Pat. No. 7,706,315, and entitled "DYNAMIC LINK ASSIGNMENT IN A COMMUNICATION SYSTEM", which is a Continuation of U.S. patent application Ser. No. 11/744,450, filed on May 4, 2007 now U.S. Pat. No. 7,684,368, and entitled "DYNAMIC LINK ASSIGNMENT IN A COMMUNICATION SYSTEM", which is a Continuation of U.S. patent application Ser. No. 09/906,171, filed Jul. 16, 2001, and entitled "DYNAMIC LINK ASSIGNMENT IN A COMMUNICATION SYSTEM", now U.S. Pat. No. 7,230,908, issued Jun. 12, 2007, which claims priority under 35 U.S.C. §119(e) to U.S. Provisional Patent Application Ser. No. 60/220,261 entitled "DYNAMIC LINK ASSIGNMENT" and filed Jul. 24, 2000. The entire disclosures of each of the listed applications are hereby incorporated by reference in their entirety for all purposes.

BACKGROUND OF THE INVENTION

1. Technical Field of the Invention

This invention is related to digital communication systems, and more particularly to multi-user satellite systems for providing user access to a global packet-switched data network.

2. Background of the Art

The advent of the Internet and the commercial opportunities offered by reaching the millions of potentially new customers which connect thereto have motivated some companies to provide wireless connectivity for those users which cannot use conventional means hardwired means. For example, satellite-based systems provide a mechanism whereby users who are only offered conventional relatively low modem speed access or have no alternative for connecting at all, can now connect to such packet-based systems at higher speeds.

However, inefficient use of resources in multi-user satellite systems results in excessive link margins that drastically reduce system capacity. Typically, the forward link from the satellite to the user is a time-multiplexed data stream that is received by a large number of user terminals. As such, the satellite must be capable of providing service to the user that is under the lowest quality link conditions. Existing satellite communication packet-based systems which offer access to the Internet can transmit digital information to users in unicast, that is, the digital information can be sent to a specific user based upon a unique identification number (ID) assigned to that user, the unique user ID derived via any number of conventional methods. However, existing unicast transmissions still fail to efficiently utilize the available bandwidth by formatting and sending the unicast data under constraints, which anticipate the worst possible reception conditions for any user to reasonably ensure that all users can receive the transmission. This "one-size-fits-all" problem requires satellite systems to operate with link margin requirements that are extremely wasteful to system capacity.

What is needed is a link architecture that allows the link to be customized on a per-user basis to more efficiently utilize channel bandwidth in the communication system.

SUMMARY OF THE INVENTION

The present invention disclosed and claimed herein, in one aspect thereof, comprises architecture for the dynamic assignment of links in a multi-user communication system. A plurality of information channels are provided in a forward communication link of the communication system for carrying channel information of the plurality of information channels from a transmitter to a plurality of corresponding receiving devices. The channel information in corresponding select ones of the plurality of information channels is varied dynamically in response to link conditions of the associated receiving devices to more efficiently utilize the channel bandwidth.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

The disclosed Dynamic Link Assignment (DLA) architecture provides the capability of more than quadrupling channel capacity in a multi-channel system by presenting a multi-user access scheme that allows the communication system to dynamically customize, without requiring resynchronization and associated loss of data, a user waveform to match the user link conditions.

In a satellite-based application, the architecture allows variable modulation and coding formats on a per-user basis through the use of Time Division Multiplexing (TDM) and Orthogonal Frequency Division Multiplexing (OFDM). A user terminal provides feedback to the satellite system such that the forward link to the user can be customized dynamically according to link conditions at any particular moment. Moreover, as the OFDM waveform is frequency and time locked, a user can change modulation and coding rapidly without resynchronization. Carrier and timing synchronization is achieved on a central, data-bearing channel. This arrangement allows the overall forward link to be customized on a per-user basis, allowing for reduced operating margin. Additionally, a combination of modulation and turbo coding provides bandwidth and power efficiency that approach Shannon's limit. Although the following discussion focuses on satellite-based systems, the disclosed architecture is not restricted to satellite systems, but has application in any multi-user digital communication system in which data transmission is to a number of users each operating under different conditions, e.g., a passive optical network.

Figure 1:
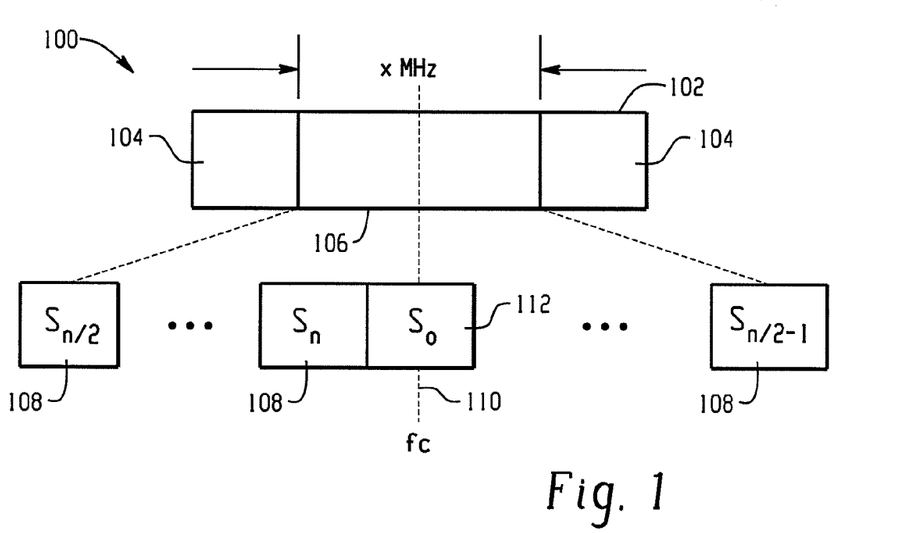
FIG. 1 illustrates a block diagram of a frequency channelization scheme, in accordance with a disclosed embodiment.

Referring now to FIG. 1, there is illustrated a general block diagram of a channelization scheme 100, in accordance with a disclosed embodiment. In OFDM, a subcarrier pulse 102 used for transmission of information is chosen to be rectangular, which shape has the advantage that pulse forming and modulation at the head-end transmitter can be performed by an Inverse Discrete Fourier Transform (IDFT) that can be implemented very efficiently as an Inverse Fast Fourier Transform (IFFT). Accordingly, at the receiver, an FFT is needed to reverse (or demultiplex) the channels. Leading and trailing guard bands 104 are used to combat multipath signals.

In general, the overall bandwidth per primary channel 106 is approximately x MHz, and each primary channel 106 is subdivided into n sub-channels S (denoted 108, and where n=0, . . . , p), that overlap in an OFDM sense, resulting in a symbol rate of x/n M-symbols/sec (Msps) sub-channel. Within each sub-channel $S_n$ 108, a frame structure is defined (and is discussed in greater detail hereinbelow) such that there are $2^z$ symbols per frame, where z is selected for optimal signal quality. The channel numbering scheme is based around a center frequency fc (denoted 110), such that a first sub-channel $S_0$ 112 is centered at the center frequency 110. The remaining sub-channels 108 are distributed about the center frequency 110 as illustrated in FIG. 1.

Figure 2:
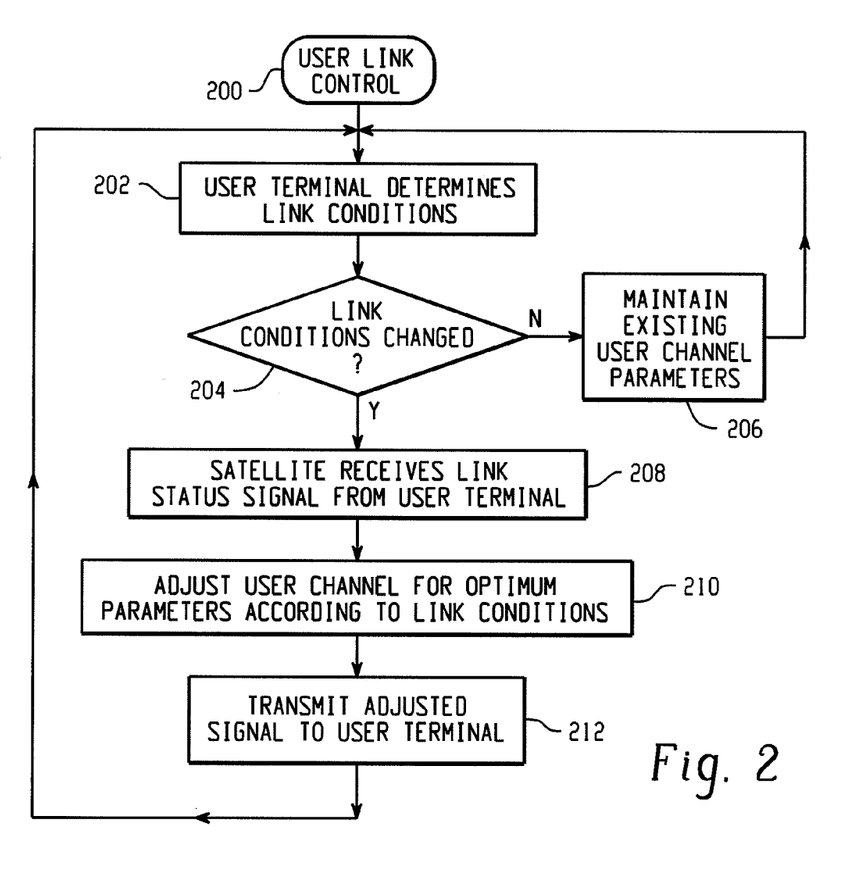
FIG. 2 illustrates a flow chart of the process for dynamically controlling a user link in accordance with present link conditions.

Referring now to FIG. 2, there is illustrated a flow chart of the process for dynamically controlling a user link in accordance with present link conditions. Flow begins at a starting point 200 and continues to a function block 202 where the user terminal (or ground-based terminal wherever it may be located) determines the current channel transmission parameters based upon the existing link conditions for that user location. Flow is to a decision block 204 to then determine if link conditions for that user channel have changed. If not, flow is out the "N" path to a function block 206 to maintain the current channel parameters for that user. Flow is then back to the input of function block 202 where the user terminal again determines the link conditions. On the other hand, if the link conditions for that channel have changed, flow is out the "Y" path of decision block 204 to a function block 208 where the satellite hub receives the current link parameters for that channel as a link status signal. The hub then adjusts the signal channel for optimum operating parameters according to current link conditions, as indicated in a function block 210. Flow is then to a function block 212 to transmit the user channel information to the user terminal under the adjusted channel parameters.

The channel adjustment process is performed dynamically in response to existing link conditions for that particular user terminal. It can be appreciated that in a power-up scenario, or where the link between the user terminal and satellite hub is lost, a synchronization process occurs under default operating condition to establish the link as soon as possible. To that end, a feedback path exists between the user terminal and satellite hub wherein the link conditions for that particular user are being continually monitored such that the forward link for that user channel can be adjusted to ensure optimum channel quality under existing link conditions. The return path from the ground-based user terminal to the satellite can be a direct wireless path from the user transmitter (e.g., a satellite dish system) to the satellite hub. Alternatively, the link from the user terminal can be via other conventional means such as a return path through a telephone line to an access provider who then completes the return link to the satellite hub. Other methods for providing the return path from the user to the satellite are commonly known by those skilled in the art.

Waveform Description

Figure 3:
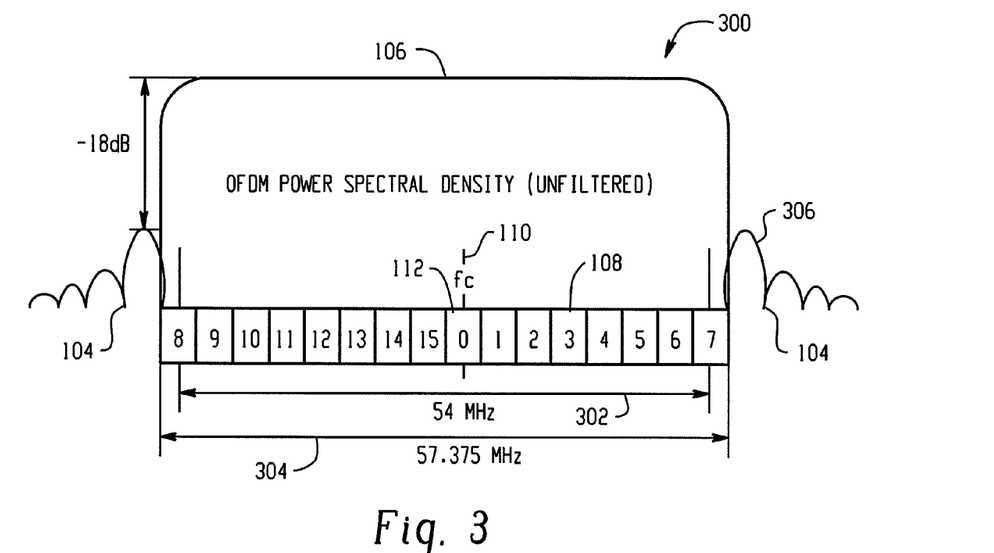
FIG. 3 illustrates a graph of an OFDM waveform and channel numbering scheme based around a center frequency.

Referring now to FIG. 3, there is illustrated a graph of an OFDM waveform 300 and channel numbering scheme based around the center frequency fc 110, in accordance with a disclosed embodiment. Note that channel zero 112 is defined as the channel that is centered on the center frequency 110. The bandwidth 302 of the main lobe 106 is nominally 54 MHz with a null-to-null bandwidth 304 of 57.375 MHz. In the unfiltered case, the first side lobes 306 are approximately 18 dB down (i.e., −18 dB) from the main lobe. In order to maintain accurate synchronization, the DLA waveform is constrained to require a special waveform in the central channel. The central channel 112 is received at the baseband, and uses a special waveform in order to maintain synchronization. The waveform in channel zero 112 consists of QPSK (Quadrature Phase Shift Key) data (no constraint on coding or gain), with some side information to aide in synchronization. Information must be present in all channel-zero 112 slots. In cases where the channels 108 do not fit "evenly" into the primary band 106, a partial channel (not shown) is supported. For partial DLA channels, channel zero 112 must be present.

Figure 4:
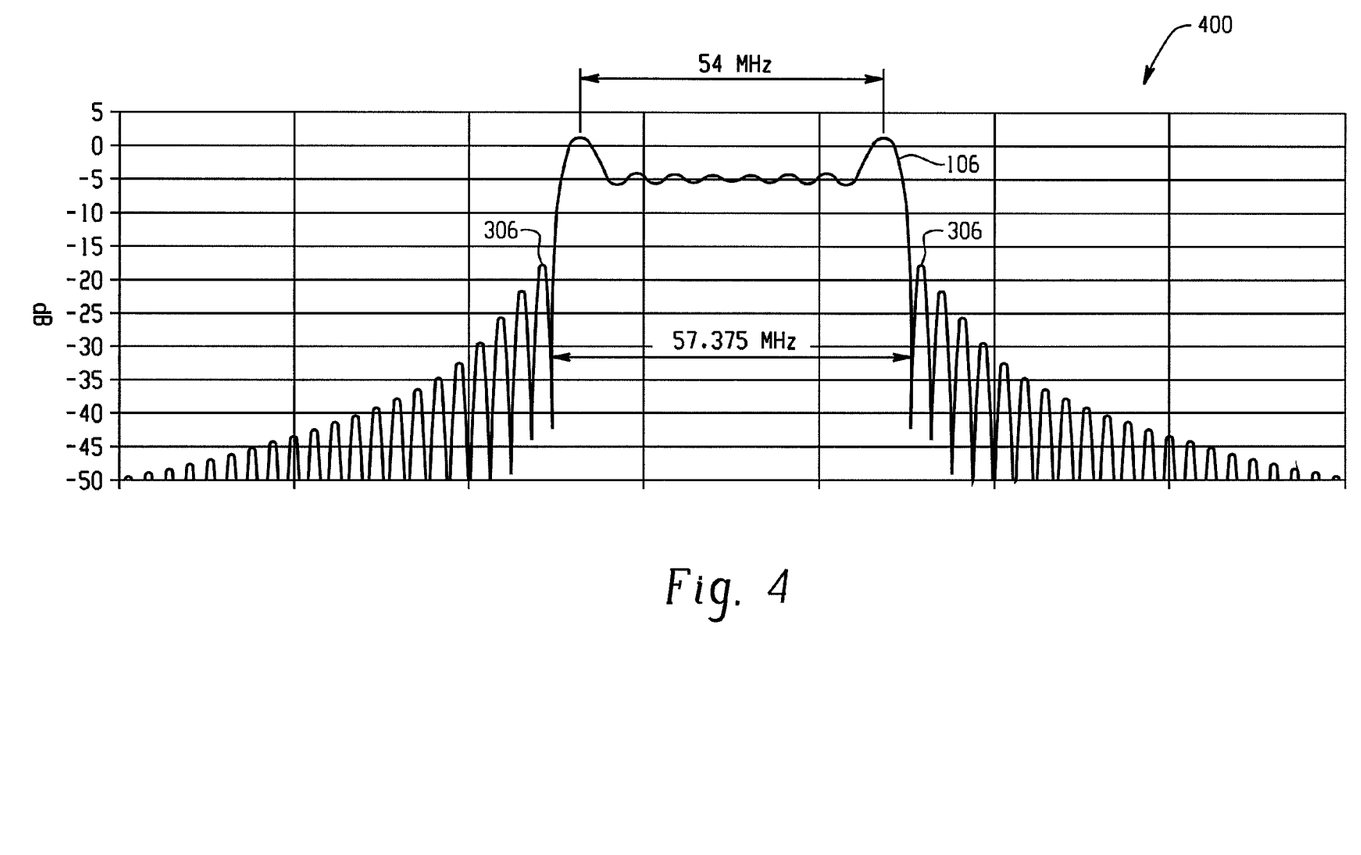
FIG. 4 illustrates a graph of frequency response of a simulated dynamic link assignment waveform.

Referring now to FIG. 4, there is illustrated a graph 400 of the frequency response of a simulated DLA waveform in the example of FIG. 3. The main lobe 106 has a bandwidth of approximately 54 MHz with the first side lobes 306 down approximately 18 dB from the main lobe 106.

Framing Description

Figure 5:
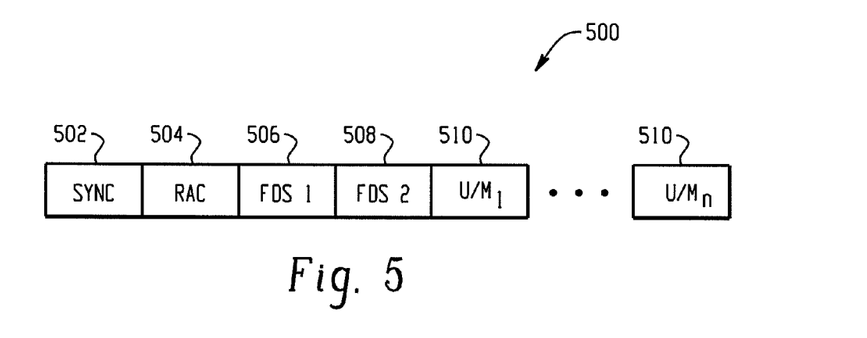
FIG. 5 illustrates organization of the various slots utilized in a frame.

Referring now to FIG. 5, there is illustrated the channelization frame structure. The DLA architecture provides a number of slot and packet types for use within the frame 500 to allow users to enter and exit the transmission system, and to provide the customized user link. The DLA slot types include one or more of the following: a Synchronization slot, a Receive Access Channel (RAC) slot, a Frame Definition State (FDS) slot, and DLA User/Message (U/M) slot.

The Synchronization slot appears as the first slot 502 once per frame 500 to allow reliable modem synchronization. The RAC slot is in the second slot 504, and is a reliable slot that contains user ID tables to allow users to enter the transmission system for data reception in the current frame 500. The entry information for both single-user IDs and broadcast/multicast IDs are supported in the RAC slot 504. In addition to system entry, the RAC slot 504 provides for a low-latency hardware-messaging path. Two FDS slots 506 and 508 contain information regarding the location (in time and frequency) of slots in the next frame, and the format (modulation, coding, and gain) of user slots in the current frame 500. The FDS slots 506 and 508 appear as the third and fourth slots on each frequency sub-channel 108. A number of U/M slots 510 (U/M1, . . . , U/Mn) contain the user transport stream payload, and comprise two classes of user slots: a single user per slot and a multi-user slot to handle low data rate traffic such as voice. The single user slot may be directed toward an individual terminal, or may be a broadcast or multicast slot as originally defined by the RAC slot 504.

DLA Synchronization Slot

Figure 6:
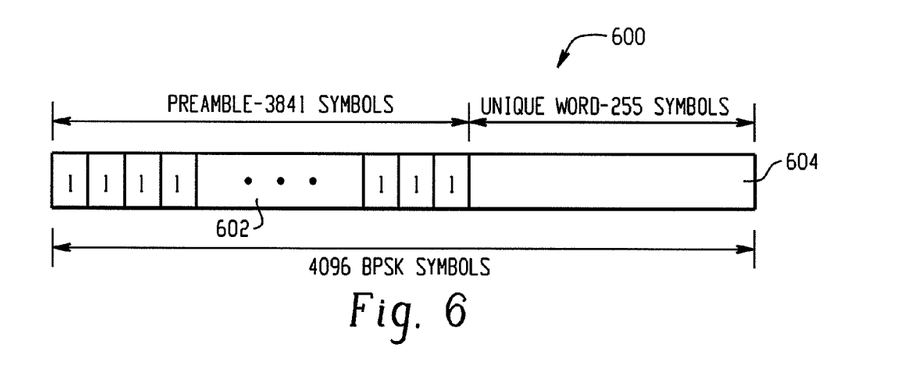
FIG. 6 illustrates a diagram of a Synchronization slot.

Referring now to FIG. 6, there is illustrated a diagram of a synchronization frame 600. The synchronization frame 600 appears as the first slot 502 of each channel 108 and each frame 500, and consists of a preamble filed 602 that contains BPSK (Binary Phase Shift Key) ones for 3,841 symbols, the utilization of which allows the terminal demodulator to acquire the carrier frequency and phase, as well as the symbol timing.

Following the preamble field 602 is a Unique Word (UW) field 604 that signifies the beginning of the frame 500. The UW field 604 consists of 255 BPSK symbols, and is generated via an 8-bit linear feedback shift register with a polynomial value of $x^8+x^4+x^3+x^2+1$, and a seed value of 0x10. The UW frame 600 is sufficient for reliable frame detection at a channel Signal-to-Noise Ratio (SNR) that corresponds to the most power efficient modulation and coding, specifically an SNR=−3.0 dB. A hard decision parallel correlator with a programmable threshold is the preferred approach for acquiring frame synchronization.

DLA Receiver Access Channel Slot

Figure 7:
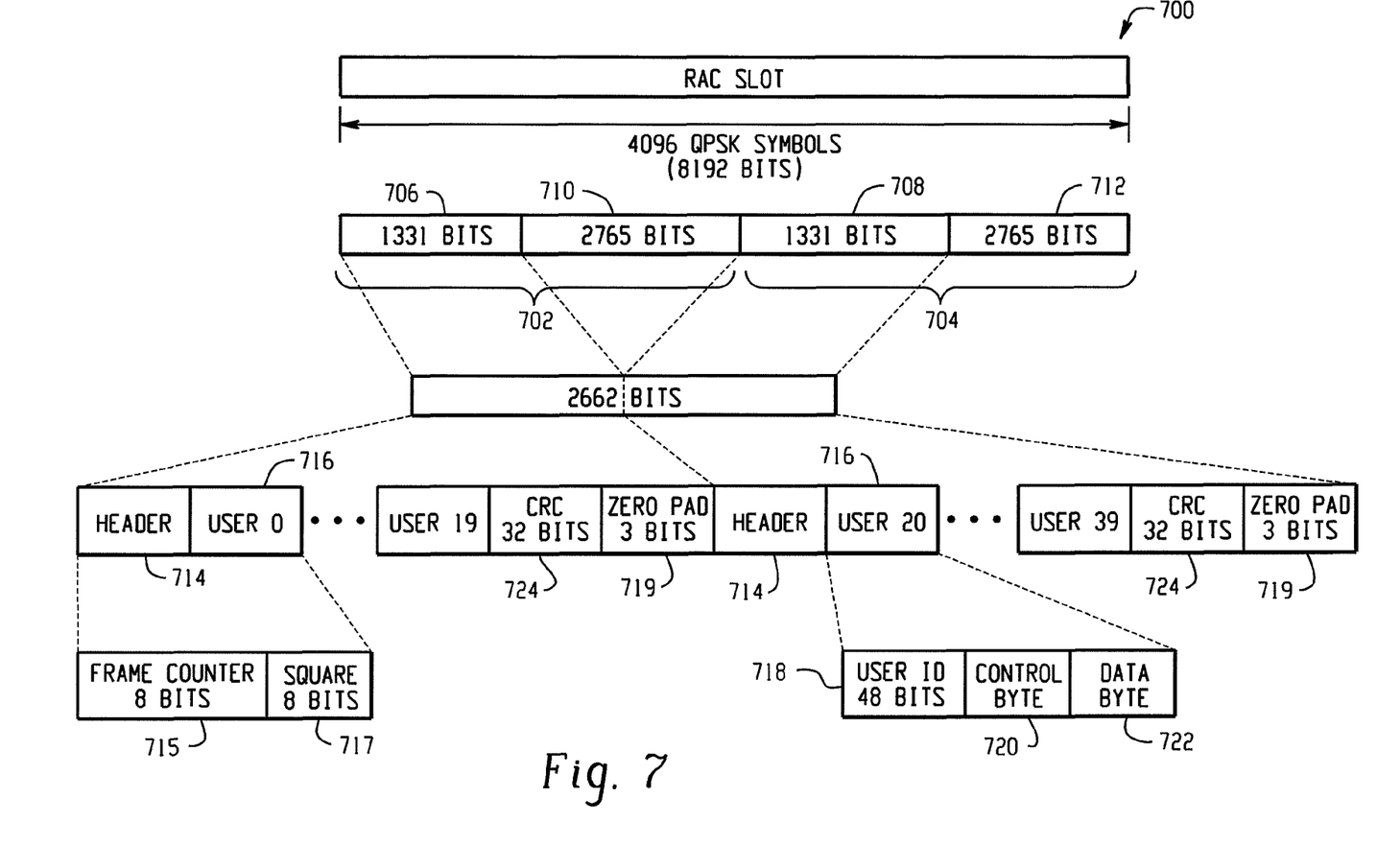
FIG. 7 illustrates a frame structure of a Receiver Access Channel slot.

Referring now to FIG. 7, there is illustrated a structure of a Receiver Access Channel frame 700. The RAC frame 700 contains information that allows users to enter the transmission system or receive messages based upon the user ID or broadcast ID. The following constraints are placed on the RAC frame 700: (1) data in RAC frame 700 that is repeated across sub-channels 108 is rotated from sub-channel to sub-channel to prevent a power surge in the DLA link, and (2) broadcast and multicast ID information must only occur in the sub-channel 108 that is equivalent to the upper four bits of the broadcast/multicast ID. This provides for ease of use and entry into broadcast/multicast data streams.

Starting in slot two 504 of every frame 500, each RAC frame 700 contains a set of individual user IDs and a smaller set of broadcast IDs. The RAC frame 700 contains 4,096 QPSK symbols encoded with two code blocks 702 and 704 of (4096,1331) TPC (Turbo Product Code) data, each having a set of 1,331 information bits (706 and 708), totaling 2,662 information bits, and each having 2,765 corresponding code bits (710 and 712). This allows for forty user IDs (Users 0-39) in each RAC frame 700, or 128 new users per second.

Each set of information bits 706 (and 708) contains a 16-bit RAC Header 714 which is the first sixteen bits of each TPC block 702 and 704. The first eight bits of the header 714 indicate a frame counter 715, and the next eight spare bits 717 of the header 714 are reserved for future use. There are twenty User fields 716 (User 0-19) per set of information bits 706 (and 708), and each User field 716 contains sixty-four bits: a 48-bit User ID 718, an 8-bit Control field 720, and an 8-bit Data field 722. Each of the User fields 716 contains information for an individual user, multicast users, or broadcast users. The 48-bit User ID (or Broadcast ID) field 718 conforms to the IEEE 802.3 standard. Each user, broadcast, and multicast is uniquely identified by the User ID 718 or physical MAC (Media Access Control) address. The broadcast and multicast IDs are made available to registered users and stored in a data file on the terminal computer. The four most-significant bits of the broadcast and multicast IDs correspond to the channel on which the broadcast is transmitted. The Control byte field 720 is a control command, and is discussed in greater detail with respect to messaging. The primary purpose of the Data byte 722 is to identify the slot number in which the user data or message appears in the current frame. However, for certain control commands, the Data field 722 can contain other data, which is discussed in greater detail hereinbelow with respect to messaging. There are two 32-bit CRC (Cyclic Redundancy Check) fields 724, one for each set of information bits 706 and 708 which provide error detection for the header 714 and the twenty user information packets 716, in their respective TPC blocks 702 and 704. There are also two 3-bit zero pad fields 719, one for each set of information bits 706 and 70-8 which serve to fill out the TPC blocks.

DLA Frame Definition State Slot

Figure 8:
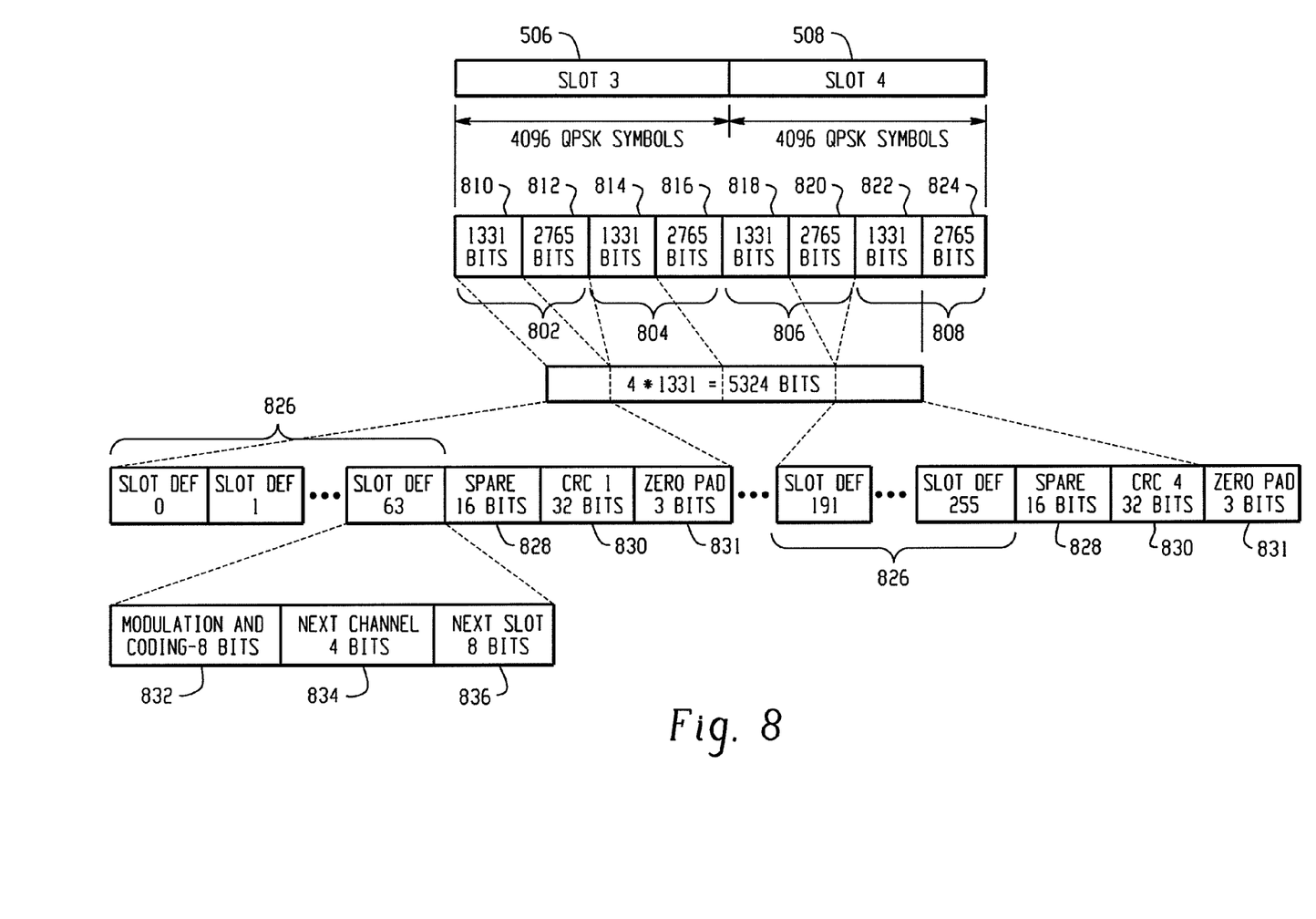
FIG. 8 illustrates a diagram of a Frame Definition slot.

Referring now to FIG. 8, there is illustrated a diagram of the third and fourth slots 506 and 508, the Frame Definition State slots. The third and fourth slots (506 and 508, respectively) in each channel are the FDS slots, and each contains the modulation, coding, gain, next channel, and next slot information for each user within a channel. Each FDS slot 506 and 508 contains 4,096 QPSK symbols, and each set of 4,096 QPSK symbols corresponds to two blocks of (4096, 1331) TPC coded data. A first TPC block 800 of the first FDS frame 506 contains 1,331 information bits 810 and 2,765 corresponding code bits 812. A second TPC block 804 of the first FDS frame 506 contains 1,331 information bits 814 and 2,765 corresponding code bits 816. A first TPC block 806 of the second FDS frame 508 contains 1,331 information bits 818 and 2,765 corresponding code bits 820. A second TPC block 808 of the second FDS frame 508 contains 1,331 information bits 822 and 2,765 corresponding code bits 824. This provides 2,662 information bits for each of the two FDS slots 506 and 508, for a total of 5,324 information bits.

Each set of information bits (810, 814, 818 and 822) further subdivides into sixty-four 20-bit Slot Definition fields which contain information about user slots [4 . . . 255], a Spare bits field 828 of sixteen spare bits, a 32-bit CRC field 830 for error detection over the previous sixteen spare bit fields 828, sixty-four slot definition fields 826, and a 3-bit zero pad field 831. The CRC field 724 adds an additional layer of error checking to prevent spurious jumps from frame to frame. Information for slots [0 . . . 3] provide default settings. Each 20-bit Slot Definition field 826 is divided into the following three sub-fields: an 8-bit Modulation, Coding, and Gain field 832 which specifies the modulation, TPC coding, and gain format of the user slot in the current frame (the default value in slots [0 . . . 3] is 0x01) (the 8-bit value is extracted by the terminal and decoded to three distinct configuration values that are used by the terminal to set-up the user slots); a 4-bit Next Channel field 834 that indicates which channel the user slot will use in the next frame (the default value in slots [0 . . . 3] is 0x00); and an 8-bit Next Slot field 836 that indicates which time slot the user slot will use in the next frame. If the Next Channel field 834 and Next Slot field 836 point to the primary RAC channel, the user goes to the RAC in the next frame.

DLA Receiver User/Message (U/M) Slots

Figure 9:
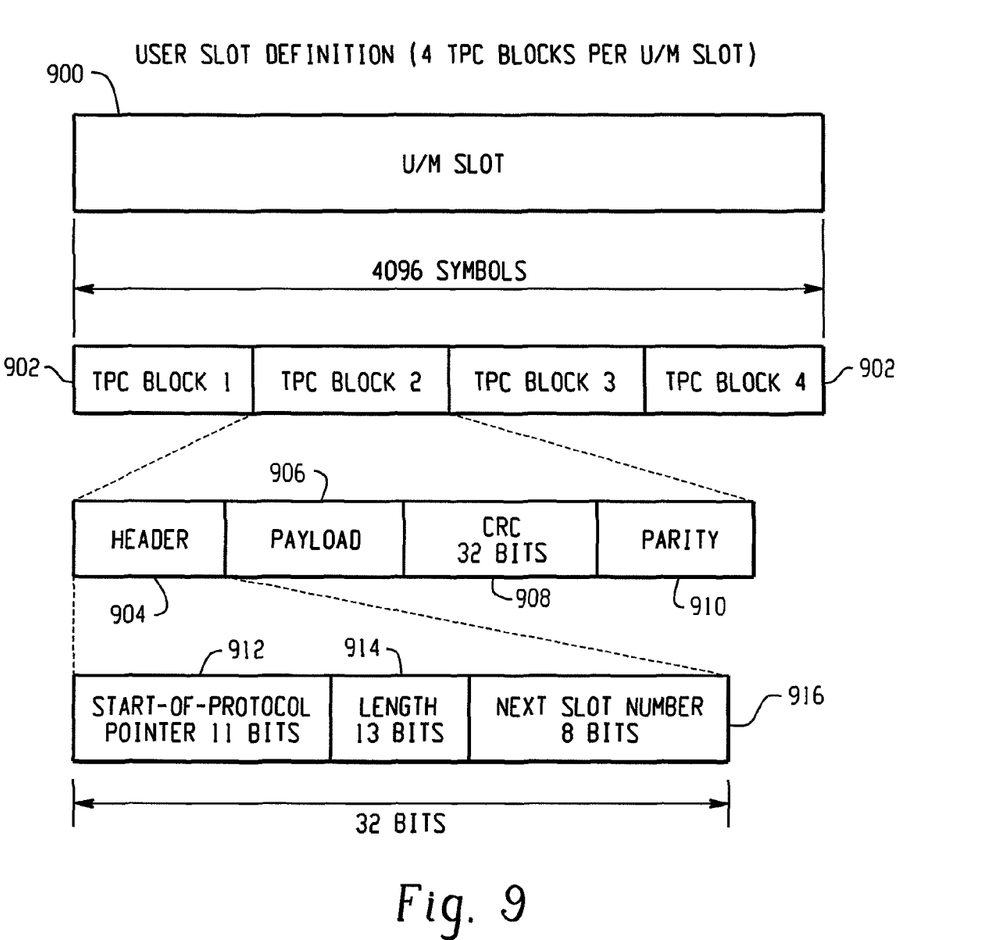
FIG. 9 illustrates a diagram of a receiver User/Message Definition slot.

Referring now to FIG. 9, there is illustrated a diagram of a user definition slot. The transport stream appears at the user slot level and is based upon a custom transport stream structure. The DLA transport stream structure varies based on the combination of modulation and TPC coding used on the channel. Each U/M slot 900 contains one or more TPC blocks 902. FIG. 9 illustrates a U/M slot 900 containing four TPC blocks 902. Each TPC block 902 contains a standard Header 904, Payload data 906, a CRC 908, and Parity bits 910. The 32-bit Header field 904 contains header information for the user slot, which user slot information is described using three sub-fields: an 11-bit Start-of-Protocol Packet pointer 912 which is used to point to a byte location in the payload filed which is the first byte of a higher layer protocol packet (IP, for example), and if no start-of-packet occurs in the TPC block, this protocol pointer field 912 is set to 0x7FF; a 13-bit Length Field 914 which identifies the length (in bytes) of the information payload 906 (and is used by the device driver to determine what data to pass to the higher layers in the protocol stack); and an 8-bit Next Slot Number filed 916 which identifies the next valid U/M slot for the user in the current frame. If it is the last slot for the user in the particular frame, this value is set to 0x00.

The size of the Payload field 906 ranges from 644 to 15,208 bits. This variable-length field 906 contains the payload that is used for transporting data or messages. Software ensures that the length of valid data in the payload field 906 is always an integral number of bytes. The 32-bit CRC field 908 provides error detection for the header 904 and payload 906 of the slot 900. The Parity field 910 is a variable-length field, which contains the TPC parity bits.

Figure 10:
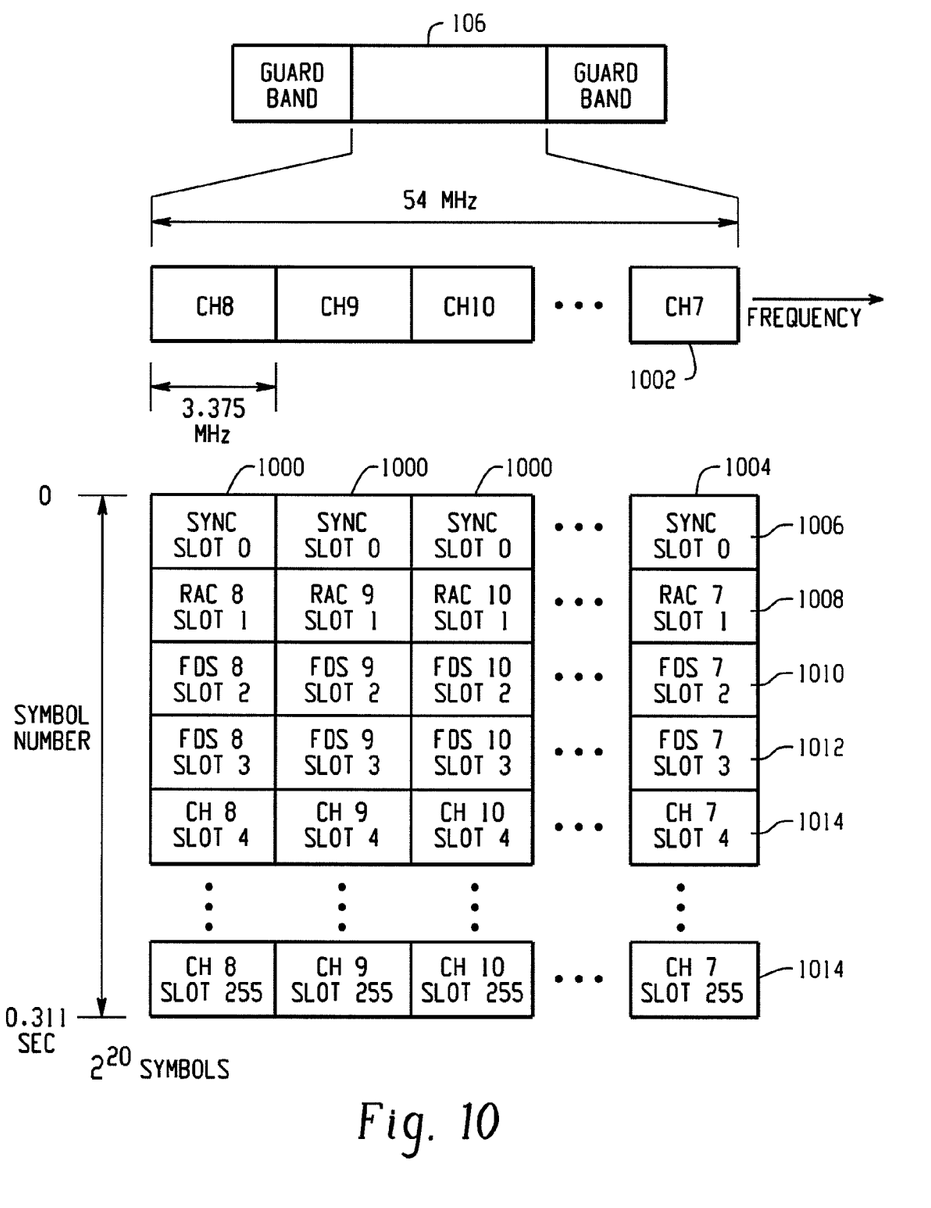
FIG. 10 illustrates an example of the channel/slot structure of the dynamic link assignment architecture.

Referring now to FIG. 10, there is illustrated an example of the channel/slot structure of the dynamic link assignment architecture. Each 54 MHz primary band 106 contains sixteen frequency-multiplexed sub-channels 108 that partially overlap in an OFDM fashion, providing bandwidth efficiency near Nyquist requirements. In this particular embodiment, the sixteen sub-channels 108 are modulated in the main lobe 106 of the subcarrier pulse 102. Each sub-channel 108 operates at $1/16^{th}$ of the 54 MHz channel frequency providing a symbol rate of 54/16=3.375 Msps. The nominal capacity $C_{nom}$ of the x=54 MHz primary channel is calculated assuming a nominal modulation and coding that yields 2.5 bits/symbol. The nominal capacity $C_{nom}$ is calculated as follows:

$$C_{nom} = (2.5 \text{ bits/symbol})(3.375 \text{ Msps/channel})$$
$$(16 \text{ channels/composite signal})$$
$$= 135 \text{ Mbps}.$$

Each sub-channel frame 1000 is structured to facilitate the disclosed link architecture. For example, in a channel 1002, the corresponding frame 1004 (for a single frame period of 0.311 seconds) begins with a synchronization frame 1006, followed by a RAC slot 1008, two FDS slots 1010 and 1012, and multiple user slots 1014. All other channels have the similar frame structure.

Note that the disclosed architecture can be implemented in hardware such that one or more digital devices are fabricated to provide a high speed solution (e.g., digital CMOS chip).

The disclosed architecture, in general, has application in any point to multi-point digital communications link in which the "multi-points" have different link conditions and feedback is provided to monitor and control the link in response to changing link conditions. For example, an application includes a cellular telephone that uses a point (base station) to multi-point (cell phones) configuration under various link conditions (e.g., antenna size, receiver sensitivity, interference, distance to base station, etc.).

The invention also has application where the overall system architecture includes a multi-point to multi-point configuration, as long as it can be decomposed into at least one point to multi-point link.

Although the preferred embodiment has been described in detail, it should be understood that various changes, substitutions and alterations can be made therein without departing from the spirit and scope of the invention as defined by the appended claims.

What is claimed is:

1. A method for transmitting one or more packets via a satellite to a selected user terminal of a plurality of user terminals, the method comprising:
   receiving information corresponding to a reception quality from the satellite for the selected user terminal, the information transmitted from the selected user terminal;
   utilizing the received information to identify a modulation and coding format for a transmission via the satellite to the selected user terminal, the identified modulation and coding format selected from a plurality of modulation and coding formats;
   associating the modulation and coding format with the one or more packets addressed to the selected user terminal, the association responsive to the identification of the modulation and coding format;
   generating a frame for transmitting the one or more packets to the selected user terminal via the satellite, wherein generating the frame comprises:
      generating a frame header identifying a size associated with a payload portion of the frame, identifying the modulation and coding format, and identifying a start of frame location; and
      encapsulating the one or more packets addressed to the selected user terminal within the payload portion of the frame; and
   transmitting the generated frame, the payload portion transmitted according to the modulation and coding format to the selected user terminal.

2. The method of claim 1, further comprising:
   receiving information from the user terminal, the information corresponding to a changed reception quality for the user terminal in excess of a threshold; and
   changing the modulation and coding format for other packets destined for the user terminal to account for the changed reception quality.

3. The method of claim 1, wherein the payload portion of the frame is a time-division multiplexed signal.

4. The method of claim 1, wherein the payload portion of the frame comprises internet protocol (IP) packets addressed to the selected user terminal.

5. The method of claim 1, wherein the payload portion of the frame is a variable-length payload portion.

6. The method of claim 1, further comprising:
   encapsulating additional packets in the payload portion of the frame addressed to the other user terminals.

7. The method of claim 1, wherein the frame header comprises binary phase shift key symbols.

8. The method of claim 1, wherein the frame header comprises a synchronization slot, a frame definition slot, and a user header slot.

9. The method of claim 1, wherein the frame header comprises a synchronization slot identifying the start of frame location, a frame definition slot identifying the modulation and coding format, and a user header slot identifying the size associated with the payload portion of the frame.

10. The method of claim 1, wherein the frame header comprises a frame definition slot identifying the modulation and coding format for the packet and a user header slot identifying a size associated with the packet, the size associated with the packet comprising the size associated with the payload portion of the frame.

11. The method of claim 1, wherein the frame header comprises a plurality of time slots of the frame before the payload portion of the frame.

12. The method of claim 1, wherein the frame header comprises a first time slot identifying the modulation and coding format and a second time slot identifying the start of frame location, and the first time slot and the second time slot are not immediately adjacent in time.

13. The method of claim 12, wherein the frame header further comprises a third time slot identifying the size associated with the payload portion of the frame, and wherein the third time slot and the second time slot are not immediately adjacent in time and the third time slot and the first time slot are not immediately adjacent in time.

14. The method of claim 1, wherein the frame header comprises a unique word to identify the start of frame location.

15. A gateway for transmitting one or more packets via a satellite to a selected user terminal of a plurality of user terminals, the gateway comprising:
  a receiver module configured to receive information corresponding to a reception quality from the satellite for the selected user terminal, the information transmitted from the selected user terminal;
  a processor module, communicatively coupled with the receiver module, and configured to:
    utilize the received information to identify a modulation and coding format for a transmission via the satellite to the user terminal, the identified modulation and coding format selected from a plurality of modulation and coding formats;
    associate the modulation and coding format with the one or more packets addressed to the selected user terminal, the association responsive to the identified modulation and coding format; and
    generate a frame for transmitting the one or more packets to the selected user terminal via the satellite, wherein the generation of the frame comprises:
      generating a frame header identifying a size associated with a payload portion of the frame, identifying the modulation and coding format, and identifying a start of frame location; and
      encapsulating the one or more packets addressed to the selected user terminal within the payload portion of the frame; and
  a transmitter module, communicatively coupled with the processor module, and configured to transmit the generated frame, the payload portion transmitted according to the modulation and coding format to the selected user terminal.

16. The gateway of claim 15, wherein
  the receiver module is further configured to receive information from the user terminal, the information corresponding to a changed reception quality for the user terminal in excess of a threshold; and
  the processor module is further configured to change the modulation and coding format for other packets destined for the user terminal to account for the changed reception quality.

17. The gateway of claim 15, wherein the payload portion of the frame comprises internet protocol (IP) packets addressed to the selected user terminal and other user terminals, wherein the payload portion is a variable-length payload portion and is time-division multiplexed.

18. A computer readable storage medium configured with instructions executable to:
  receive data corresponding to a signal quality for received transmissions from the satellite at the selected user terminal, the signal quality data generated at least in part by the selected user terminal;
  utilize the received signal quality data to identify a modulation and coding format for a transmission via the satellite to the user terminal, the identified modulation and coding format selected from a plurality of modulation and coding formats;
  associate the modulation and coding format with one or more packets addressed to the selected user terminal, the association responsive to the identified modulation and coding format;
  generate a frame for transmitting the one or more packets to the selected user terminal via the satellite, wherein the generation of the frame comprises:
    generating a frame header identifying a size associated with a payload portion of the frame, identifying the modulation and coding format, and identifying a start of frame location; and
    encapsulating the one or more packets addressed to the selected user terminal within the payload portion of the frame; and
  transmit the generated frame to the selected user terminal, the payload portion transmitted according to the modulation and coding format.

19. The computer readable storage medium of claim 18, wherein the instructions are further executable to:
  receive data from the user terminal, the information corresponding to a changed reception quality for the user terminal in excess of a threshold; and
  change the modulation and coding format for other packets destined for the user terminal to account for the changed reception quality.

20. The computer readable storage medium of claim 18, wherein the payload portion of the frame comprises internet protocol (IP) packets addressed to the selected user terminal and other user terminals, wherein the payload portion is a variable-length payload portion and is time-division multiplexed.

21. A method for transmitting one or more packets via a satellite to a selected user terminal of a plurality of user terminals, the device comprising:
  receiving information corresponding to a changed reception quality for the selected user terminal for transmissions received from the satellite, the information generated at least in part by the selected user terminal;
  evaluating the information to identify a changed modulation and coding format from a plurality of modulation and coding formats for transmissions to the selected user terminal;
  associating the changed modulation and coding format with one or more packets addressed to the selected user terminal, the association corresponding to the identification of the changed modulation and coding format;
  generating a frame for transmitting the one or more packets to the selected user terminal via the satellite, wherein generating the frame comprises:
    generating a frame header identifying a size associated with a payload portion of the frame, identifying the modulation and coding format, and identifying a start of frame location; and
    encapsulating the one or more packets addressed to the selected user terminal within the payload portion of the frame; and
  transmitting the one or more packets in the payload portion of the generated frame according to the changed modulation and coding format, the transmission to the selected user terminal via satellite.

22. The method of claim 21, wherein the payload portion of the frame comprises internet protocol (IP) packets addressed to the selected user terminal.

23. The method of claim 21, wherein the payload portion of the frame is a variable-length payload portion.

24. The method of claim 21, further comprising:
  encapsulating additional packets in the payload portion of the frame addressed to the other user terminals.

25. The method of claim 21, wherein the frame header comprises a synchronization slot identifying the start of frame location, a frame definition slot identifying the modulation and coding format, and a user header slot identifying the size associated with the payload portion of the frame.

26. The method of claim 21, wherein the frame header comprises a frame definition slot identifying the modulation and coding format for the packet and a user header slot identifying a size associated with the packet, the size associated with the packet comprising the size associated with the payload portion of the frame.

27. The method of claim 21, wherein the frame header comprises a plurality of time slots before the payload portion of the frame.

28. The method of claim 21, wherein the frame header comprises:
a first time slot identifying the modulation and coding format;
a second time slot identifying the start of frame location, wherein the first time slot and the second time slot are not immediately adjacent in time; and
a third time slot identifying the size associated with the payload portion of the frame, and wherein the third time slot and the second time slot are not immediately adjacent in time and the third time slot and the first time slot are not immediately adjacent in time.

29. The method of claim 21, wherein the frame header comprises a unique word to identify the start of frame location.

* * * * *